Feb. 13, 1940.  G. POTAPENKO  2,190,320
METHOD OF DETERMINING THE PRESENCE OF OIL
Filed Dec. 22, 1937
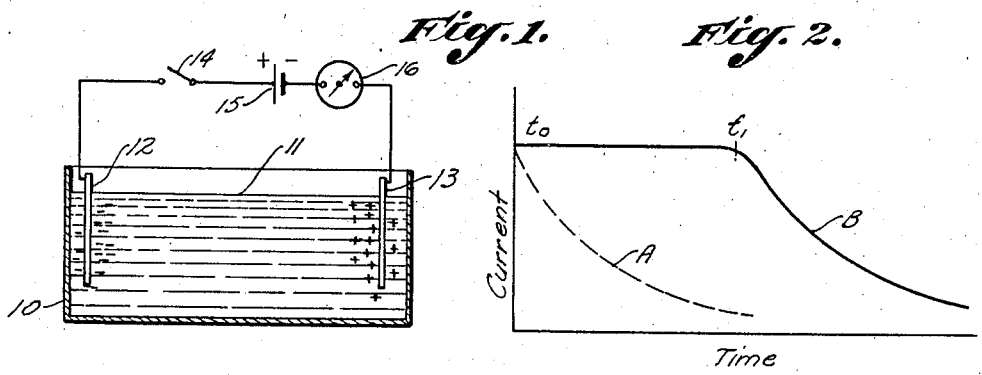
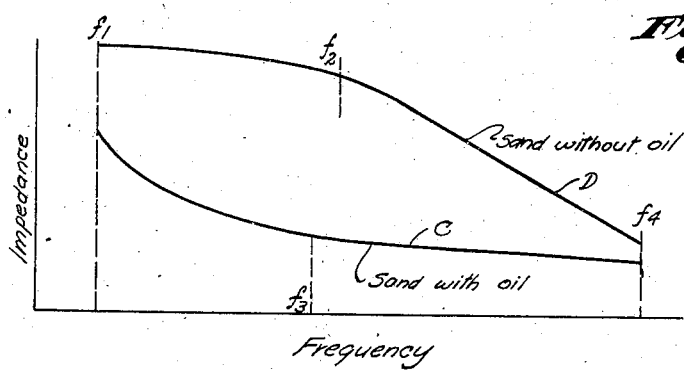
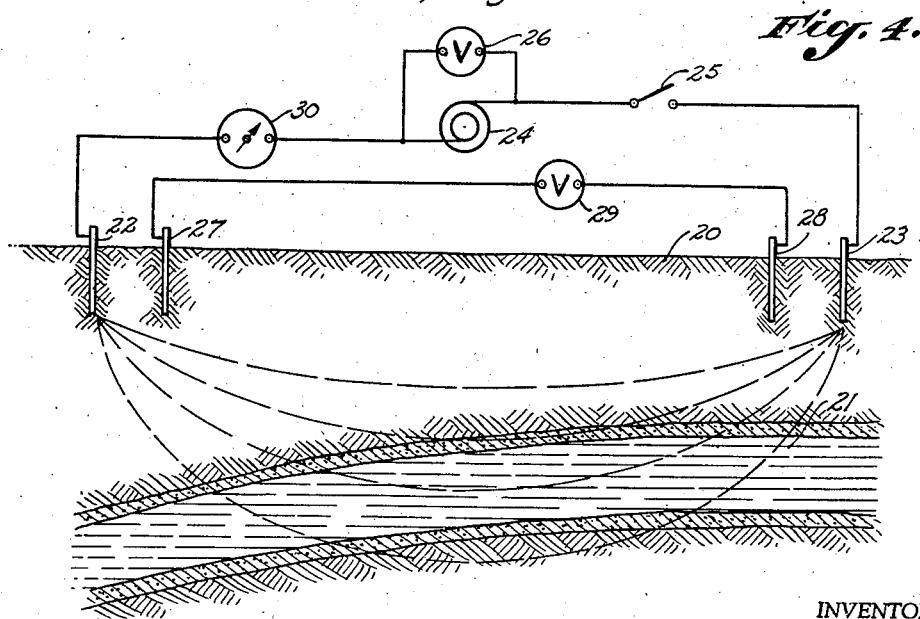
INVENTOR.
Gennady Potapenko,
BY
ATTORNEY.

Patented Feb. 13, 1940

2,190,320

UNITED STATES PATENT OFFICE 2,190,320

METHOD OF DETERMINING THE PRESENCE OF OIL

Gennady Potapenko, Pasadena, Calif., assignor to Geo-Frequenta Corporation, a corporation of Delaware Application December 22, 1937, Serial No. 181,144

4 Claims. (Cl. 175—182)

My invention relates to a method of and means for determining the presence of oil, and has a particularly important application in geophysical prospecting as an aid in locating oil in the earth.

An object of my invention is to provide a means and method for determining the presence of oil in the earth.

Another object of the invention is to provide a means and method of oil prospecting which is suitable in wet soil as well as in dry.

Still another object of my invention is to provide a means and method of oil prospecting which is capable of giving a result that is unique for oil.

These objects I attain in a manner which will be clear from a consideration of the following description taken in connection with the accompanying drawing, of which:

Fig. 1 illustrates an experimental arrangement for demonstrating the basic facts underlying my method for determining the presence or absence of oil.

Fig. 2 is a chart showing the variation of current with time in the apparatus of Fig. 1 for a non-oil-bearing substance A, and for oil B.

Fig. 3 is a chart showing the relation of impedance and frequency obtained for non-oil-bearing earth D and for oil-bearing earth C in the practice of my invention under conditions similar to those present in Fig. 1.

Fig. 4 is a diagrammatic view of apparatus employed in carrying out my method of oil prospecting in the field, showing the earth in cross-section.

My method of uniquely determining the presence of oil is based upon a phenomenon of electrolytic conduction and polarization which may best be understood by reference to Figs. 1 and 2. Assume a tank 10 to be filled with a liquid 11, the polarizing electrodes 12 and 13 being immersed in the liquid and connected in a circuit with a switch 14, a battery 15, and a galvanometer 16, the electrodes 12 and 13 being connected to the positive and negative terminals, respectively, of battery 15. For ordinary electrolytes which do not contain oil, if the switch 14 is closed at time $t_0$, current flows in the circuit in a quantity determined by Ohm's law, but immediately starts to decrease, the current varying with time approximately as represented by curve A of Fig. 2. The reason for this decrease in current is the polarization of the electrolyte caused by a shift in opposite directions of oppositely charged ions within the liquid and concentration of these charged ions in the neighborhood of the electrodes, as shown. This difference in concentration of electrically charged ions produces in effect a counterelectromotive force within the electrolyte portion of the circuit which reduces the electromotive force available to send current therethrough.

When, however, in the apparatus of Fig. 1, the liquid 11 is oil, the current time curve is that designated by the letter B. The current does not start to decrease at once, but remains substantially constant until a certain time $t_1$, whereupon the current decreases in a similar manner to ordinary non-oily liquids presumably due also to polarization. Why polarization should be delayed only in the case of oil for a time period from $t_0$ to $t_1$, is not understood. This time interval during which polarization is delayed is of the order of 1 second. When the substance 11 is not pure oil, but contains oil, the curve representing the variation of current with time lies between curve A and curve B and partakes more of the character of curve B, the more nearly the substance approaches pure oil.

I have discovered that this difference in the time dependence of polarization may be taken advantage of in determining the presence of oil in a medium such as earth in which the principal conduction takes place electrolytically. If the battery 15 of the circuit of Fig. 1 is replaced by a variable frequency, low frequency alternating current generator and the galvanometer 16 be replaced by an instrument suitable for measurement of alternating current, I find by experiment that curves similar to C and D of Fig. 3 are obtained for media such as non-oil-bearing and oil-bearing sands, respectively. The effect of polarization, is here shown as varying the impedance of the medium, the impedance being taken as the quotient of the effective alternating electromotive force applied to the electrodes and the effective alternating current flowing in the circuit.

It will be observed that starting at a relatively high frequency $f_4$, which may be a few hundred cycles per second, the impedance of the non-oil-bearing sand (curve D) increases rapidly as the frequency of the alternating current source is lowered until a frequency $f_2$ is reached, beyond which the impedance increases at a gradually decreasing rate. In contrast to this behavior, the impedance of the oil-bearing sand, as illustrated in curve C, increases only very little from frequency $f_4$ down to frequency $f_3$ which is of the order of 1 or 2 cycles per second, where it starts a more rapid increase and at frequency $f_1$ is approaching the impedance of the non-oil-bearing sand. Thus, the presence of oil in a medium greatly changes the kind and character of relationship between impedance and frequency, which relationship reflects the dependence upon time of the polarization of the medium.

The curves of Fig. 3, it is thought, may be explained on the basis of the unidirectional phenomena illustrated in Fig. 2 as follows. Consider first the case of the non-oil-bearing sand. It will be clear that if the alternating electromotive force of the source alternates very rapidly, the polarization which effects a decrease in current (or an increase in impedance) will not have time in which to build up. For relatively high frequencies, then, the current should be a maximum, or the impedance a minimum. As the frequency of the source is lowered, more time is allowed before reversal of the electromotive force in which polarization may build up; consequently the current should fall, or the impedance should rise. This action corresponds to and explains that part of curve D from $f_4$ to $f_2$. The frequency $f_2$ corresponds to that for which the time between reversals of the electromotive force is so long that polarization has proceeded almost as far as it will go and, therefore, the impedance does not change so rapidly at frequencies below $f_2$.

The shape of curve C may be explained in a similar manner by consideration of Fig. 2. In the case of the oil-bearing sand, the current starts with a certain value at the high frequency $f_4$. In pure oil we should theoretically expect the current to remain unchanged as the frequency of the source is lowered until the time between reversals becomes of the order of the time interval $t_0$ $t_1$, for in oil polarization does not start to build up until after the interval $t_0$ $t_1$ has elapsed. While oil-bearing sand is not pure oil and should not be expected to exhibit the identical polarization curve B of pure oil, the polarization curve is affected radically by the presence of oil in the sand and causes the rapid rise of impedance to be delayed until frequencies below $f_3$ are reached, there being only a very gradual rise in impedance from $f_4$ to $f_3$. At a frequency $f_3$, the time between reversals is presumably sufficiently long to permit polarization to start, and for lower frequencies than this the impedance increases rather rapidly.

The existence of polarization appears in effect to change the electrical character of the polarized medium from a pure resistance into the equivalent of a more complicated electrical circuit including elements having an impedance dependent upon frequency. It will be evident that variations from the conditions existing in the arrangement of Fig. 1 may change the equivalent electrical circuit and result in corresponding differences in the relation between impedance and frequency. Such variations may consist in differences in the character of the contiguous strata in the case of an inhomogenous medium, the arrangement of the inhomogeneities with respect to the electrodes employed, and the character and properties of the electrodes. But under any conditions a marked difference will be noted between the curves of impedance vs. frequency for oil-bearing material and non-oil-bearing material, and this difference may be employed to determine the presence of oil.

I preferably employ these phenomena practically in prospecting for oil in a manner that can best be seen by reference to Fig. 4. Here the earth is designated by numeral 20 and is represented as being composed of various strata including a zone of oil-bearing earth 21. I preferably place in electrical connection with the earth a pair of spaced electrodes 22 and 23 and connect them in a circuit with a variable frequency, low frequency source 24 of alternating current, a switch 25 and an alternating current measuring instrument 30. I may maintain the voltage of the source 24 constant as read on the voltmeter 26, or if any appreciable voltage drop exists in the conduits leading to the electrodes, I may adjust the voltage of the source so as to maintain the effective alternating potential difference between the electrodes 22 and 23 substantially constant. Or, I may connect the meter 26 by suitable leads directly to the electrodes 22 and 23 for measurement of the electrode potential difference. While I ordinarily employ a source 24 adapted to generate alternating current having a wave shape corresponding to a sine curve, alternating current having other wave shapes may be employed.

In operation, I vary the frequency of the source 24 so as to traverse the frequency range in which the difference between oil-bearing earth and non-oil-bearing earth most effectively exhibits itself in the relation between impedance and frequency, and record the effective alternating current at a plurality of frequencies within the range of variation, the number of observations made being sufficient to establish the character of dependence of impedance upon frequency.

Normally I traverse the range of frequencies from about 0.01 to 100 cycles per second. The impedance at the various frequencies is then calculated as the quotient of the effective alternating potential difference between electrodes 22 and 23 and the effective alternating current passing in the circuit. The impedance is then plotted against the frequency as in Fig. 3. If the curve has a shape characteristic of non-oil-bearing material under the existing circumstances, the earth traversed will be judged to contain no oil; whereas if the curve has a shape characteristic of oil-bearing material, oil will be known to exist in the earth traversed.

In the field, I preferably make a set of determinations in this manner, sufficient to establish a curve of impedance vs. frequency, with a relatively close setting of the electrodes 22 and 23, then increase the spacing between the electrodes and make a similar set of observations, repeating this operation at a series of electrode spacings. Curves are then plotted for each electrode spacing. In this manner it is possible to arrive at an approximation of the depth of the oil-bearing layer in the earth. The further apart the electrodes are, the deeper may be layers of earth which can affect the current in the circuit. As the electrodes in Fig. 4 are separated further and further, the layer of oil-bearing earth 21 will have a greater and greater effect upon the current variation with frequency and it will be clear from an inspection of the curves for various electrode spacings that an oil-bearing zone is being penetrated. The electrode spacing at which the deviation from curves having a shape characteristic of non-oil-bearing earth toward curves having a shape characteristic of oil-bearing earth first becomes noticeable will serve to indicate the approximate depth of the oil-bearing layer.

Instead of measuring the potential difference between electrodes 22 and 23 through which the current passes to and from the earth, I may provide an additional set of electrodes 27 and 28 preferably located between, but not close to, the electrodes 22 and 23, and connect them through a potential measuring instrument 29 to measure the potential difference across a portion of the earth traversed by the current through meter 30. The effective alternating potential difference between electrodes 27 and 28 and the current in meter 30 are then measured as the frequency is varied, and a specific impedance is computed from these values at various frequencies, from which deductions as to the presence of oil may be made. In computing this specific impedance Z, the following formula may be employed when electrodes 27 and 28 lie between the electrodes 22 and 23:

$$Z = \frac{V}{I} \cdot \frac{\pi L^2}{4a}\left(1 - \frac{A^2}{L^2}\right)$$

in which V is the effective alternating potential difference between electrodes 27 and 28; I is the effective alternating current in the circuit of electrodes 22 and 23; $a$ is the distance between electrodes 27 and 28; and L is the distance between the electrodes 22 and 23. It will be understood that the electrodes 27 and 28 are not necessarily located between the electrodes 22 and 23, but may be moved about to explore the entire region around the electrodes 22 and 23.

It will be observed that I have provided a method for determining the presence of oil which gives results that are unique for oil. Another valuable feature of my method is that it is suitable to be employed in wet soils in which high frequency radiation methods are at a disadvantage because of the great absorption of high frequency radiation in wet soil.

It is understood that various modifications in the method here disclosed and in the means provided for carrying it out may be made by those skilled in the art without departing from the spirit of the invention as defined in the appended claims.

I claim as my invention:

1. A method of oil prospecting which includes subjecting the earth to a polarizing electromotive force, and determining the dependence upon time of the resultant earth polarization.

2. A method of oil prospecting which includes subjecting the earth to a polarizing electromotive force, and determining the time delay in the build-up of the resultant earth polarization.

3. A method of oil prospecting which comprises subjecting the earth to a low frequency alternating electric field, varying the frequency of alternation of the field and determining the dependence upon frequency of the resultant earth polarization.

4. A method of oil prospecting which comprises: applying a low frequency alternating electromotive force to a portion of the earth to produce an alternating current therethrough, varying the frequency of alternation of said electromotive force, and determining the dependence upon frequency of the resultant earth polarization by measuring the variation of earth impedance with frequency.

GENNADY POTAPENKO.